United States Patent [19]

Honda et al.

[11] Patent Number: 4,665,544
[45] Date of Patent: May 12, 1987

[54] HOME CONTROL SYSTEM AND INTERPHONE SYSTEM

[75] Inventors: Yoshiyuki Honda, Yokohama; Mitsunobu Esaki, Kamakura; Yoshiji Minagawa, Chigasaki; Kazuho Uemura; Masahiro Inoue, both of Kamakura, all of Japan

[73] Assignee: Mitsubishi Denki Kabushiki Kaisha, Tokyo, Japan

[21] Appl. No.: 772,580

[22] Filed: Sep. 4, 1985

[30] Foreign Application Priority Data

Sep. 5, 1984 [JP] Japan .................... 59-186063

[51] Int. Cl.⁴ .................................. H04M 11/00
[52] U.S. Cl. .............................. 379/104; 379/102
[58] Field of Search ...................... 179/2 A, 2 R

[56] References Cited

U.S. PATENT DOCUMENTS

| | | | |
|---|---|---|---|
| 3,842,208 | 10/1974 | Paraskervakos. | |
| 3,916,405 | 10/1975 | Gotanda. | |
| 4,023,139 | 5/1977 | Samburg | 179/2 A |
| 4,097,690 | 6/1978 | Kuntz et al. | 179/2 A |
| 4,266,097 | 5/1981 | Cannon et al. | 179/2 A |
| 4,390,750 | 6/1983 | Bartelink | 179/5 |
| 4,442,319 | 4/1984 | Treidl. | |
| 4,493,948 | 1/1985 | Sueg et al. | 179/2 A |
| 4,538,031 | 8/1985 | Benning et al. | 179/2 A |

Primary Examiner—Gene Z. Rubinson
Assistant Examiner—David R. Schuster
Attorney, Agent, or Firm—Armstrong, Nikaido, Marmelstein & Kubovcik

[57] ABSTRACT

A home control system includes a pair or plural pairs of home information transmission path (referred to as home bus); information outlets provided at the home bus which serve as connection nodes for appliances; and a plurality of room monitor controllers (hereinafter referred to as RMC) each having a built-in interface unit which has a control function element peculiar to respective rooms and carries out communication control between the information outlets and the appliances.

5 Claims, 8 Drawing Figures

1: (RMC) Room monitor controller
2: Additional interphone
3: Fire sensor
4: Gas sensor
7: Window sensor
8: Water level sensor
9: Water temperature sensor
16: Additional interphone at entry hall
17: Illumination
18: Air conditioner
19: Rice cooker
20: Gas valve
21: Analog(voice) bus
22: Digital(control) bus
23: Information outlets
24: Information outlets
25: Telephone main device
26: IFU (interface unit)
28: Subscriber line

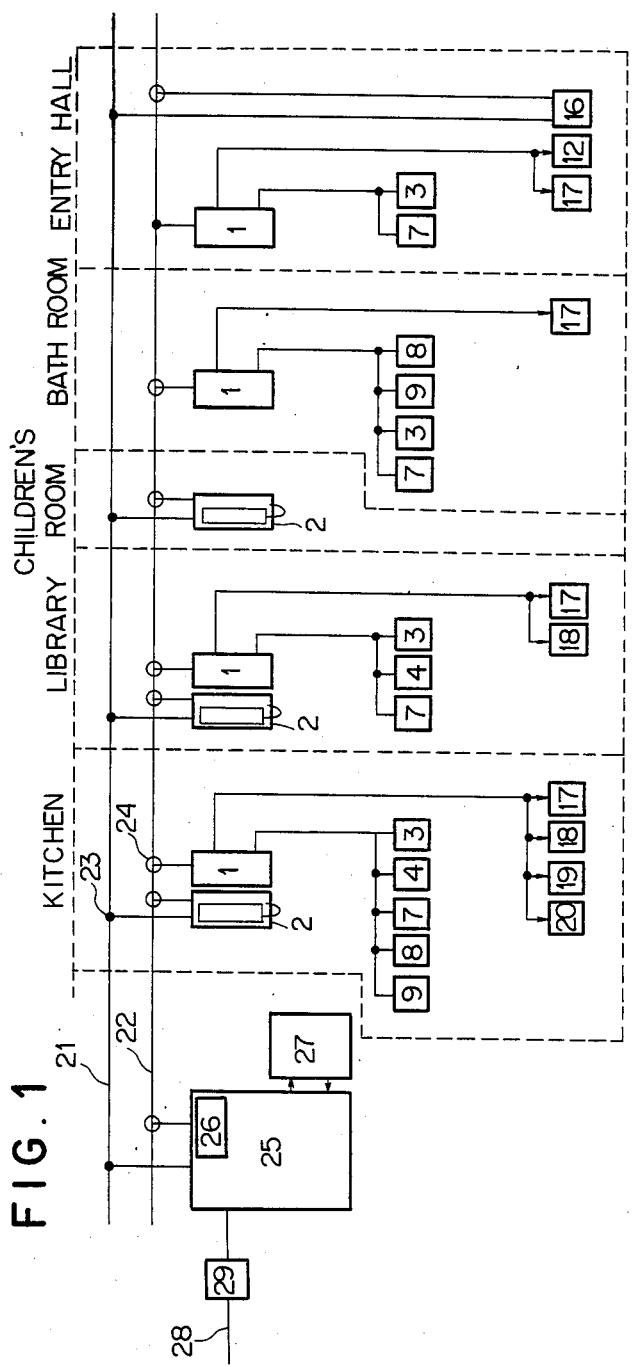

FIG. 1

1: (RMC) Room monitor controller
2: Additional interphone
3: Fire sensor
4: Gas sensor
7: Window sensor
8: Water level sensor
9: Water temperature sensor
16: Additional interphone at entry hall
17: Illumination
18: Air conditioner
19: Rice cooker
20: Gas valve
21: Analog (voice) bus
22: Digital (control) bus
23: Information outlets
24: Information outlets
25: Telephone main device
26: IFU (interface unit)
28: Subscriber line FIG. 4
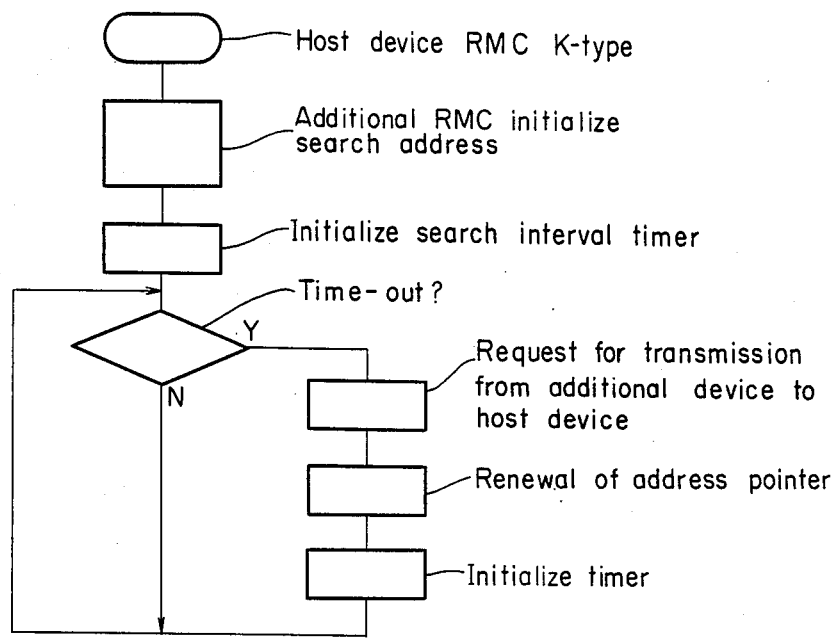
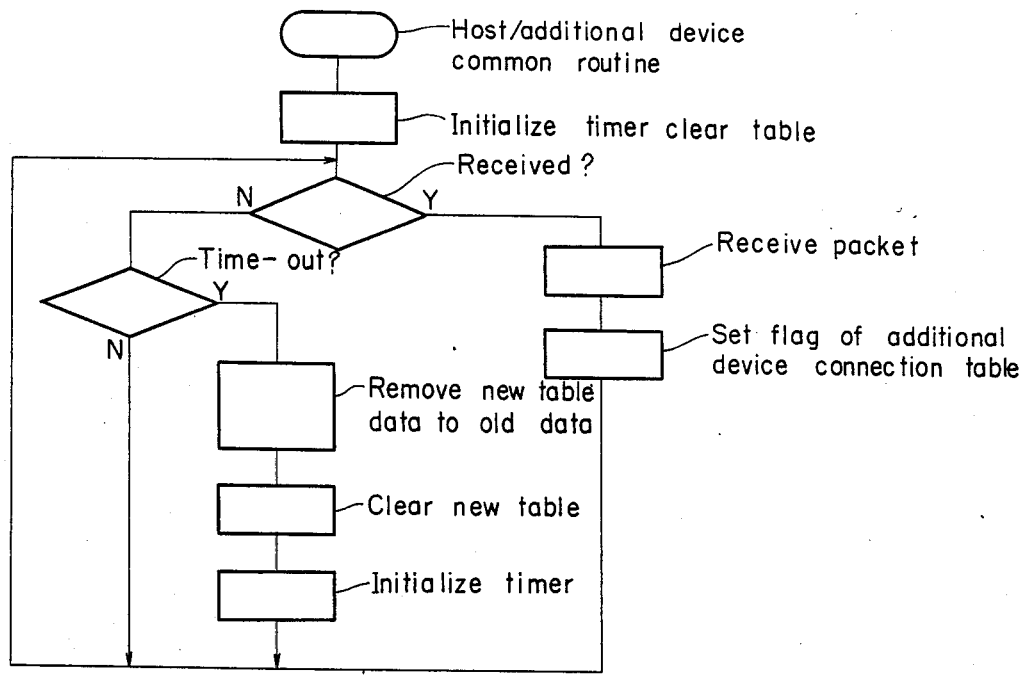

HOME CONTROL SYSTEM AND INTERPHONE SYSTEM

BACKGROUND OF THE INVENTION

The present invention relates to a home control system, and more particularly to a home control system for security such as prevention of crimes and fire in house and for control of domestic appliance or interphones.

A typical example of a home control (also referred to as a home monitor) which is commercially available is shown in FIG. 8 (refer to NEC technical bulletin Vol. 35, No. 9, 1982). In the drawings, reference numeral 1 represents a home monitor main body 2 an interphone annexed to the home monitor; 3 a fire sensor having one of crime and fire prevention functions which are main functions of a home monitor; 4a gas leakage sensor; 5 an air ventilation sensor; 6a water leakage sensor; and 7 an invasion sensor. As other house keeping inputs, there are provided a bath water level sensor 8; a bath water temperature sensor 9; a room temperature detection sensor 10; a two-system remote control switch 11 for operating a lamp (not shown) above an entry hall steps. As outputs, there are provided an electric lock 12, a ventialtion fan stopping and operating relays 13 and 14 which are actuated in response to the detection of fire and gas leakage (for example the relays are commanded to stop and actuate when fire and gas leakage are detected respectively), an output signal 15 for alarming an abnormality in a room to a control room and a connection signal 16 which is fed to an additional interphone. (The description of the more detail of the panel will be omitted).

The prior art home control system has been formed as mentioned above. Its feature resides in that minimum functions necessary for house keeping or home control are centralized in a central control board (or monitor board), that respective input/output devices are star connected (one to one wired) with the controller main body, and that accident occurence and alarm are transmitted to users by synthesized voice so that they are readily recognizable, and that the system has a function that a part of the abnormality are transmitted to a superintendent room. It is deemed that the system configuration has an excellent cost performance as home control device for apartment house.

However it will become impossible for the prior art system to cope with the increase in the number of appliances to be monitored or controlled due to an increase in the number of rooms in an apartment house, the remote location of the appliances from the central controller and the variety of requests of users in usual separate houses. Specific problems are that (1) wiring is complicated, (2) the system has no extendability, (3) there is no functional compatability between interphone and control system and (4) it is not easy to cope with various applications.

SUMMARY OF THE INVENTION

The present invention was made for solving these problems. The present invention assures the extendability and reduction in the number of wires by distributing and distributed controlling a plurality of RMC (room monitor controller) processing control functions suitable for each room, and connecting them with an information communication path (hereinafter referred to as a home bus) for enabling centralized control.

It is another object of the present invention to provide the system with a function capable of adding RMCs around the host RMC, each functioning as a host device (which is apparently identical with the other RMC, therefore a special host RMC is not provided) on system extension, and to provide a host and other RMCs with a function of always monitoring what and how many RMCs are being operated so that no adverse affect will be obtained irrespective of addition or removal of an RMC during energization.

It is a further object of the present invention to adopt a semidistribution system for overcoming the drawbacks possessed by a distribution and central control system. This is seen in that respective distributed RMCs accomplish the local processing in response to the abnormality occurence at sensor input or changes in switch input, and then communicate its changes to the other RMC via home bus or IFU.

In accordance with the present invention, the features of the afore-mentioned RMC system are all applied to interphones. When a plurality of interphones are installed in a conventional manner, a multiplicity of wires are necessary so that work is not only difficult, but also much of the system cannot perform the functions such as holding, transfer, simultaneous speaking, and loud speaking. It is also a further object of the present invention to provide an interphone having good performance with a minimum of wirings by systemizing the interphones RMC system.

In one aspect of the present invention, there is provided a home control system comprising a pair or plural pairs of home information transmission path (referred to as the home bus); information outlets provided at said home bus which serve as connection nodes for appliances; and a plurality of room monitor controllers (hereinafter referred to as RMCs each having a built-in interface unit which has a control function means peculiar to a respective room and carries out communication control between the information outlets and the appliances.

In another aspect of the present invention, there is provided an interphone system comprising a pair or plural pairs of interhome information transmission path (hereinafter referred to as the home bus); information outlets provided at said home bus which serve as connection nodes for the other interphones, and a plurality of interphones, each having a built-in interface unit (IFU) which has a control function means peculiar to a respective room and carries out communication with the other interphone, an interphone of a plurality of said interphones being provided with a main control device for controlling the communication among the interphones so that it functions as a host interphone.

Since the RMCs in respective rooms function independently of each other and receive and transmit signals with another room's RMC using the home bus via the IFU having a built-in IFU, an RMC only needs be connected to the home bus via an information outlet when the RMC is to be added. Accordingly the extendability of the system is great.

In the interphone system the interphones provided in respective rooms are capable of communication with the other interphones via the IFU built-in interphone, the connected home bus, and a parent interphone. Accordingly when an interphone is to be added, it only need be connected with the home bus via the information outlet. Therefore the extendability of the system is great.

BRIEF DESCRIPTION OF THE DRAWINGS

FIG. 1 is a schematic diagram showing an embodiment of the present invention;

FIG. 4 is a schematic flow chart of a connection monitor program which monitors what type of RMC and how many of each type of RMC are connected to each other;

DESCRIPTION OF THE PREFERRED EMBODIMENTS

Figure 2:
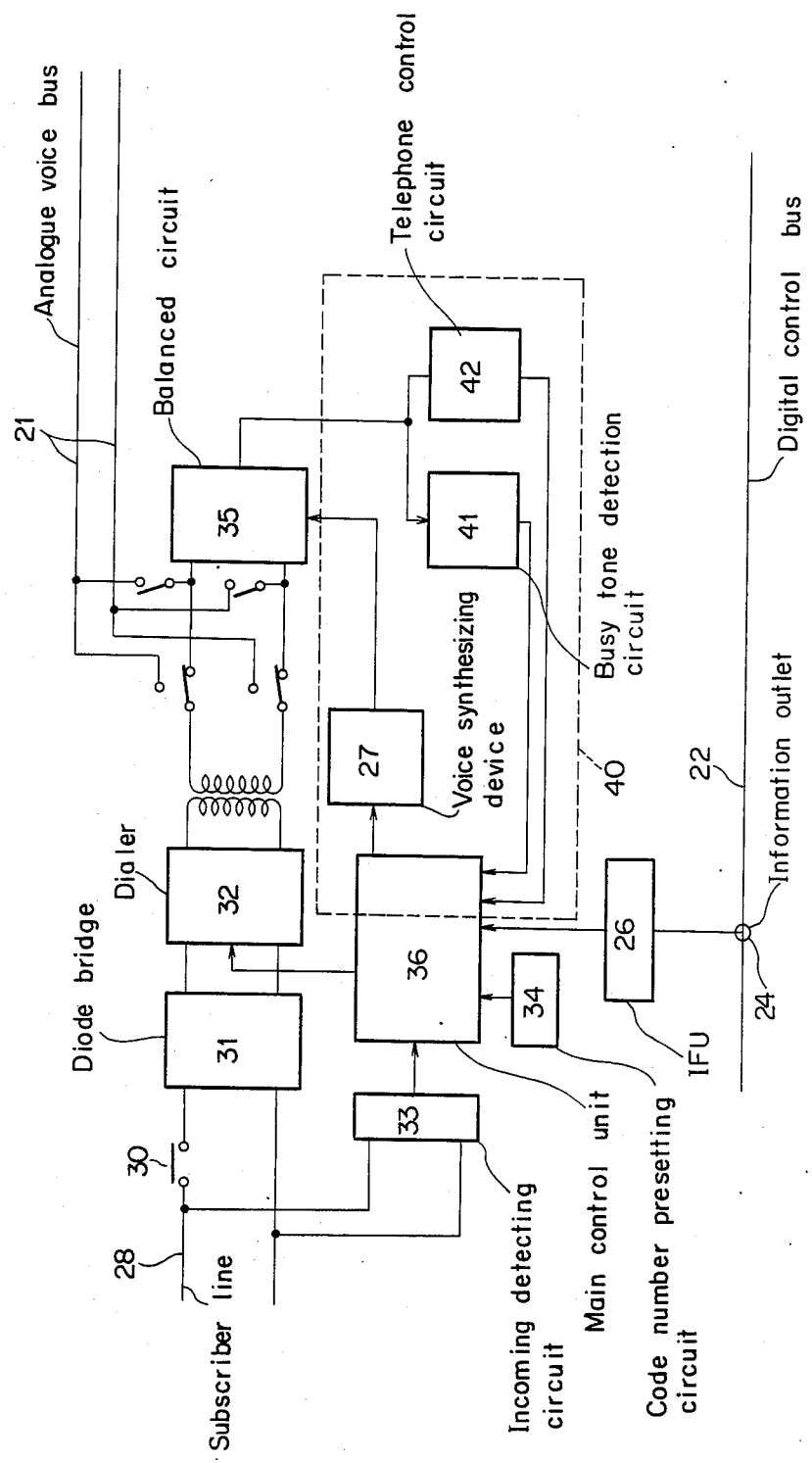
FIG. 2 is a circuit block diagram showing the detail of the main device of FIG. 1.

FIG. 1 is a block diagram showing an embodiment of a system in accordance with the present invention. In the drawing the parts having the same functions as those in prior art (FIG. 8) are designated by like reference numerals.

Figure 8:
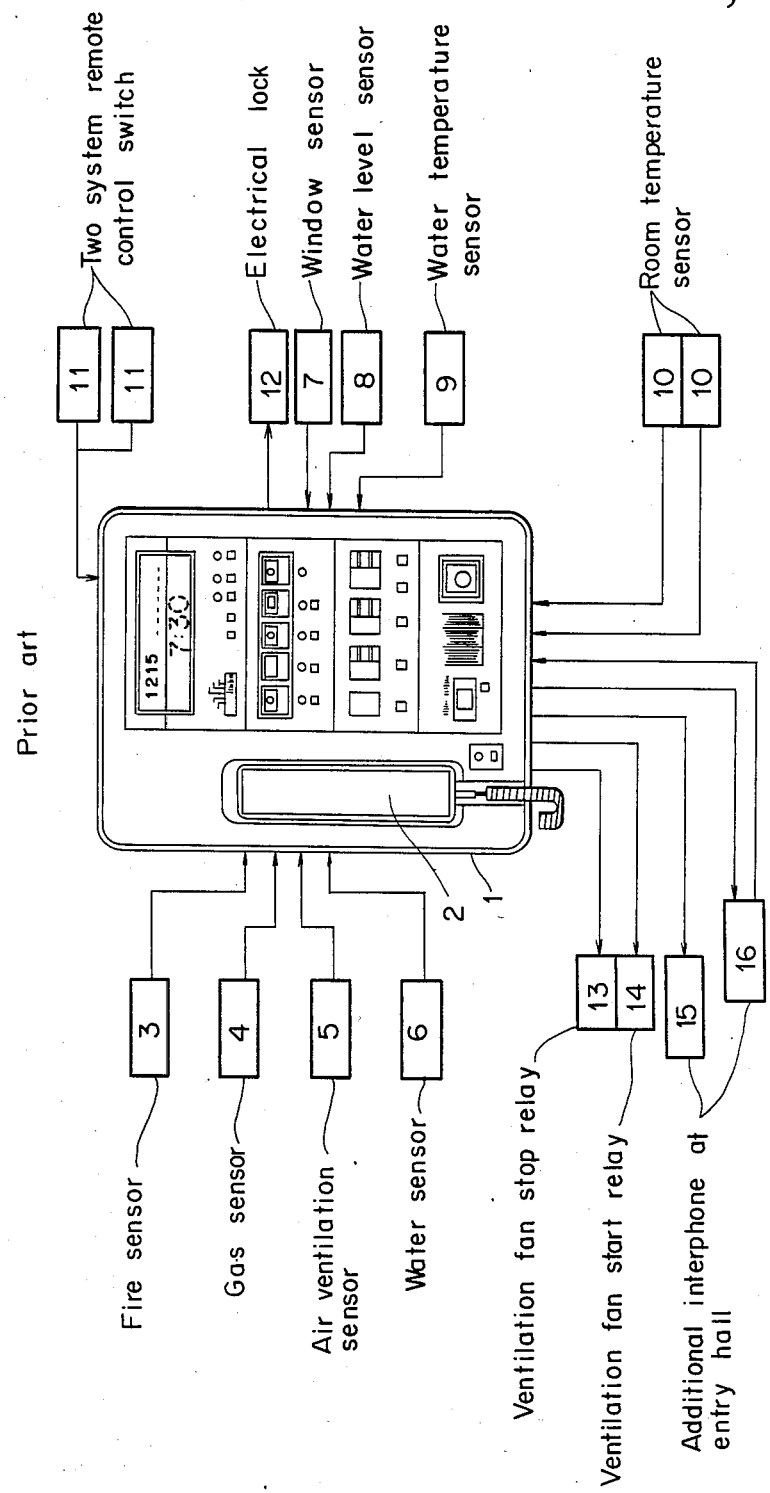
FIG. 8 is a view showing a prior art home control system.

Reference numeral 1 represents a home monitor main body which is similar to the conventional home monitor (or controller) as shown in FIG. 8. This monitor is referred to as an RMC in this invention and is distributed in different rooms according to needs.

This RMC 1 mainly comprises a host computor 50 which is referred to as, for example, personal computor, home computor, home controller; and an interface unit (IFU) 26. The hose computor 50 (see FIG. 5) comprises an output port having a driver for controlling loads (electric appliances); an output port for display; an input port for receiving input information; ROM or RAMs for storing control programs; and a CPU for processing the afore-mentioned components. The data received by the RMC is transformed into parallel data through the IFU 26. During this period, inquiry of address, and decoding of error, check, and control codes are carried out in the IFU 26. The decoded data are handed to the host computor 50 in hand shake mode. When the data is to be transmitted, the data which has been prepared in the host computer 50 are also handed to the IFU 26 in hand shake mode. Reference numeral 2 represents an interphone which may be provided at each room if desired, similar to RMC 1. In this embodiment, the interphones are provided at the kitchen and the library in combination with the RMC 1. An interphone is separately provided in a children's room. An apparatus such as a light provided in the children's room is not controlled by the RMC and is separately provided. Reference numerals 3 to 16 represent components having the same names and functions as those of prior art. Reference numeral 17 represents an illumination or light; 18 an air conditioner; 19 a rice coocker; and 20 a gas valve. Control relays and semiconductor switches are incorporated in these loads. The air conditioner 18, rice cooker 19, and gas valve 20 are not provided as loads of all RMC 1, but can be provided if desired. Reference numeral 21 is an analogue (voice) bus, 22 is a digital (control) but, and 23 and 24 are information outlets for connecting the RMC 1 and the interphone 2 with respective busses. Reference numeral 25 represents a telephone main device for central control of the interphone or using the interphone as home telephone (system telephone). The telephone main device incorporates an IFU (interface unit) 26 for controlling the communication with digital information outlets 24. The IFU 26 is incorporated in all RMCs 1 and interphones 2. The IFU 26 is also incorporated in an additional interphone 16. Reference numeral 27 represents an voice synthesizing device which is used for voice response when home appliances are monitored/controlled by connecting the telephone main device 25 with subscriber's line 28 via a rosette 29.

FIG. 2 is a circuit block diagram showing the details of the telephone main device 25 in FIG. 1. Relevant components 21 and 28 are identical with those in FIG. 1. Reference numeral 30 is a fixed switch of telephone; 31 a diode bridge; 32 a dialer; 33 an incoming detecting circuit; 34 a code number presetting circuit; 35 a balanced circuit; 36 a main control unit for receiving the signals from a busy tone detection circuit 41 in the telephone control circuit 42, or DTMF receiver 42, for receiving and processing the signals from incoming detection circuit 33 and code number presetting circuit 34, for driving and controlling a dialer 32 or voice synthesizing circuit 27 and for transmitting information to the other devices (such as interphone 2 or RMC 1 . . . refer to FIG. 1) via the IFU 26.

Since it is deemed that the place where best effect may be obtained is the kitchen in the thus arranged home security/control system, the RMC 1 installed in the kitchen is referred to as RMC-k type and is used as a parent device for the other RMC such as a G type in library, a B type in bathroom, or an E type in entry hall. A fire sensor 3, gas sensor 4, window sensor 7, water level sensor 8 for bath, bath water temperature sensor 9 are provided as input terminals of RMC-k 1. A light 17, air conditioner 18, rice coocker 19 and gas valve 20 are provided as output terminals.

In such a manner, the input/output terminals of RMC-k 1 is restricted to the terminal peculiar to kitchen, so that the hardware are prevented from becoming complicated.

Figure 3:
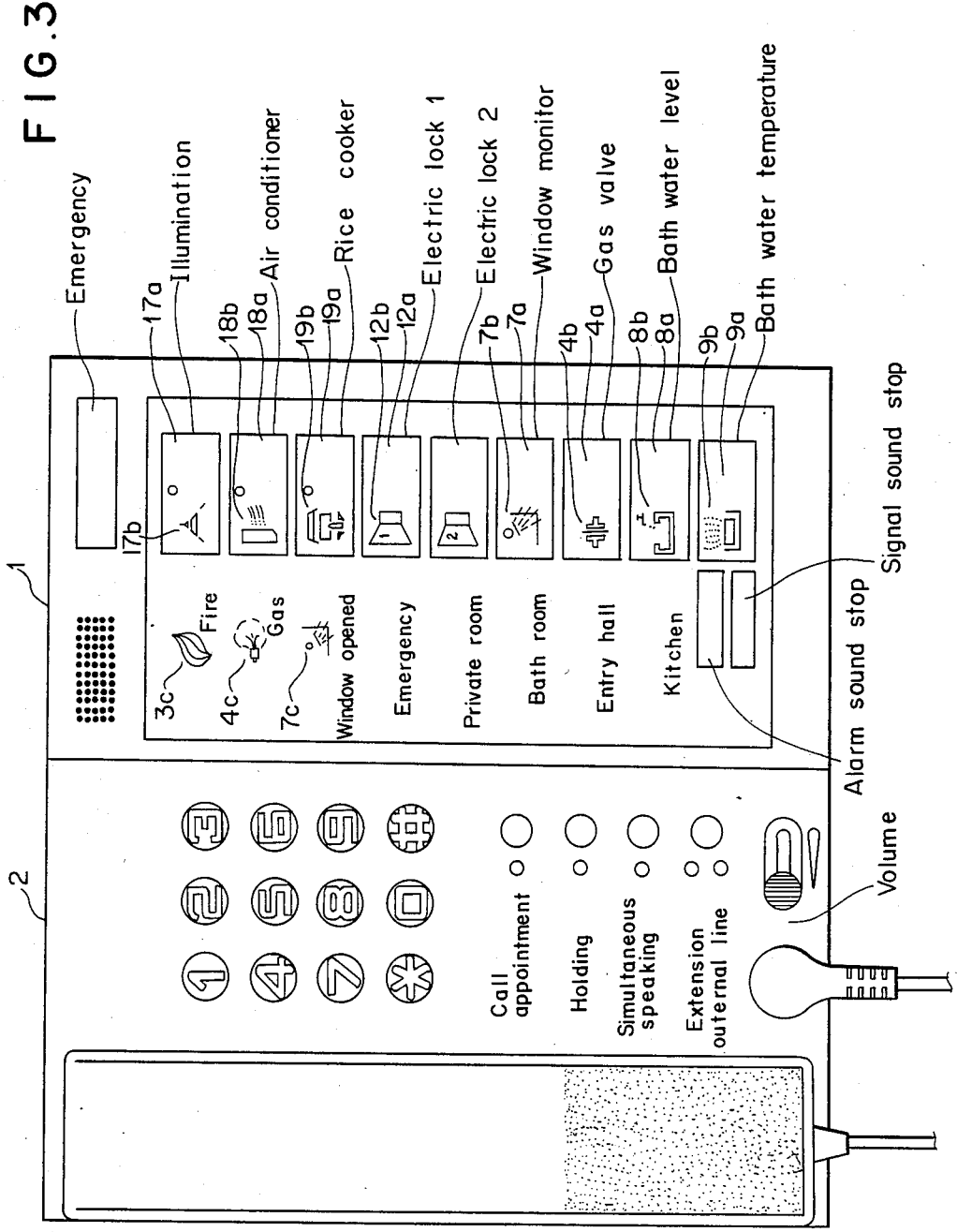
FIG. 3 is a front view showing the panel of an RMC of the present invention.

FIG. 3 shows the front panel of the main body of the RMC-k 1 and interphone 2. The front panel is formed as will be described so that it has functions as a parent device. Reference numerals 17a and 17b represent remote switches which turn on or off the light 17 and a display which displays the state of the switch respectively. Reference numerals 18a, 18b, 12a to 12b represent a load, switches for air conditioner 18 and electric lock and display for condition of the same respectively. 7a and 7b represent preset switches which turn on or off the monitoring of the window sensor 7 and a display for displaying any one of the modes. 7c indicates whether or not the window is actually opened. The monitoring of the fire sensor 3 and gas sensor 4 is carried out through the indication of 3c and 4c. Furthermore for gas valve, bath water level and bath water temperature detection, respective input units (switches) and displays are provided.

RMCs and interphones in other rooms are provided, on the front panel thereof, with switches and displays required for the other room on similar to those in the kitchen.

The operation of the present invention will be described in detail. The RMC will now be described.

Since the RMC-k 1 functions in a similar manner a conventional home monitor as mentioned above, single a RMC-k 1 may be disposed. Single RMC-k will function well in most homes, and particularly in apartment houses. The RMC has therein a control circuit which detects a sensor input, and selects one of a plurality of pseudo sound generators in accordance with the kind of abnormality for audio-visually alarming it through a built-in speaker and for displaying a picture and characters on the panel of the main body 1. Since a connection management program which always monitors whether or not the other RMCs (G, B and E types) are connected is stored in the control circuit, and when more than one RMC is to be connected, the RMC which has detected the abnormality transfers the data to the other RMC confirmed via the IFU 28 for alarming the other room's abnormality to all RMCs after it has carried out the audio-visual local processing (the abnormality occurred in a given room is alarmed by the RMC in its room) which has been described in connection with the k type RMC.

FIG. 4 shows a flow chart for carrying out connection management. The connection management program is not always specific in that various RMCs are connected with plural home busses and is also necessary to the case changes take place.

For example, addition or conversion may be carried out in the original small system configuration, or the system may be enlarged according to needs. The number of devices and conduction state (the device is energized or not) may be changed when the device used in the kitchen is moved to a bed room. If the program in the controller (for example, the control program in RMC parent device or interphone parent device) is changed whenever the circumstances are changed, a great adverse influence would be given to the extendability of the system.

Therefore in the present invention, main and additional devices store a program for automatically managing the changes in the number of device or operation conditions in for a limited number of devices.

FIG. 4 shows an example of flow chart. For example, in the RMC-k which is a parent device for an RMC, the address of the RMC additional device is initialized at step 401. Thereafter a packet is successively fed from a single to a maximum number (for example, 12) of devices to request the transmission from child to host device at the address. If the packet from the additional device does not reach, the program will time-out as shown in host/additional common routine below the FIG. 4 for changing the registration. That is, no-connection is assumed. If the connection packet reaches from the additional device, the address of the additional device is read to set a flag of connection cable. Similar operation is also carried out in the additional device.

If this operation is repeated at a given interval (for example, 7 seconds) by successively searching from the host device, the kind of and the number of devices which have been connected will always be monitored.

On the other hand, the additional device, which has been just turned on, is not registered in the main device until one search cycle completed. When the abnormality etc. occurs before the completion of one cycle, a packet is automatically sent out from the additional device. When the host device receives any packet as shown in lower side of FIG. 4, a flag is set to the additional device's connection cable to complete registration.

Figure 5:
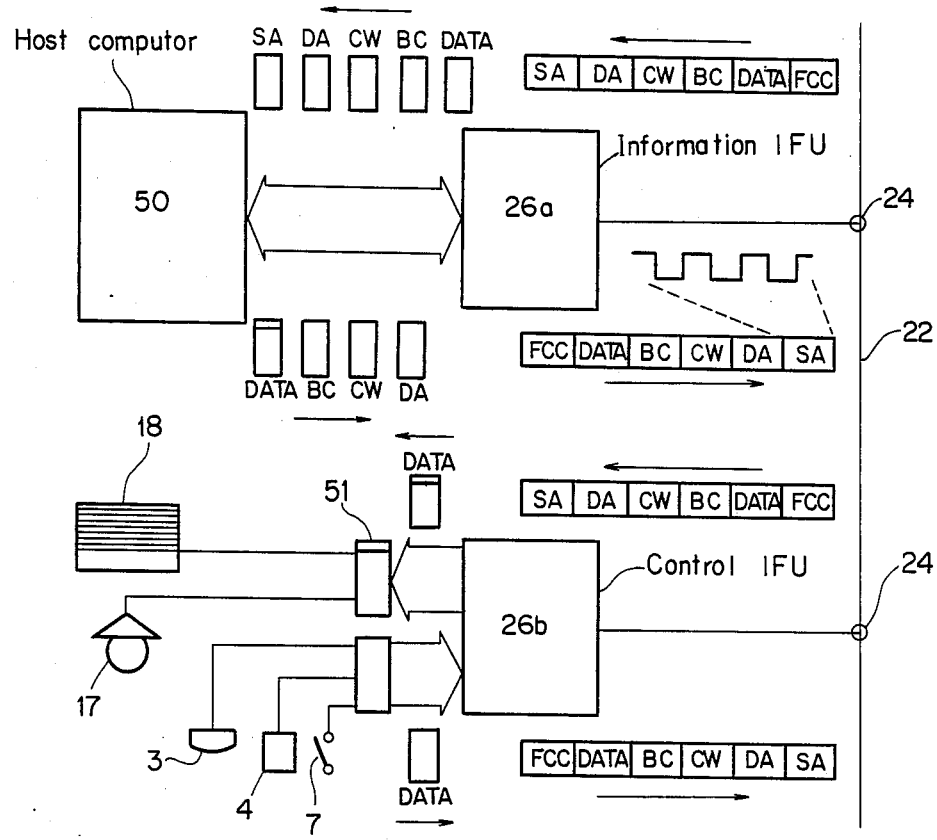
FIG. 5 is a schematic view showing the basic operation of IFU.

Since there are provided two programs including a program for regularly managing the connection of additional devices from the host device and a program which is accepted by forcedly requesting the connection from the additional device even when registered, system configuration having an excellent extendability and flexibility may be provided. FIG. 5 shown that signals are serially transferred via the IFU 26 and the digital bus 22. In FIG. 5, reference numeral 3 represents a fire sensor; 4 a gas sensor; 7 a window sensor; 17 light; 18 an air conditioner; 22 a digital bus; 24 information outlets; 26a and 26b IFUs, 26a being an information IFU which is connected with a host computor, having a function of receiving and transmitting much data, 26b being a control IFU which is capable of processing about an 8 bit input/output data by the IFU main body alone without he aid of said host computor. If it is assumed that the most significant bit of the output port of the control IFU 26b be connected with the most significant bit of the driver 51 which turns on or off the air conditioner and that the address of the control IFU 26b (DA=destinanation's address viewed from the host computor 50) be known on turning on the air conditioner 18, when the host computer 50 outputs the data having the most significant bit "1" after the DA, SA (host address), CW (control word), BC (byte counts) etc. to the information IFU 26a. The information IFU 26a transforms information from parallel format into serial signals and outputs them on the digital bus 22. The control IFU 26b receives the serial signals on the bus and transforms them into parallel signals for checking the transmission source and transmission destination (whether or not the signal corresponds to own address). The control IFU takes the following data and latches them on the output port if the data are true. Since the signal "1" is output to the driver 51 at the same time, the air conditioner 18 is turned on. On the contrary, when sensors 3, 4 and 7 for fire, gas, or window, which are connected with the control IFU 26b are operated, information is transmitted in a direction opposite to that of the afore-mentioned case to confirm presense or absense of the abnormality.

The other operation mode will be described with reference to FIG. 1 again. The light 17, air conditioner 18, and rice coocker 19 are remote controlled by respective switches on the panel. The operation of them is displayed with the pictures and characters in FIG. 3. The gas valve 20 is automatically cut off by the operation of the gas sensor 4. Resetting is manually carried out after the removal of all abnormalities have been confirmed.

The signal transmission and reception between RMC-E type (entry hall) and RMC-K type (kitchen) will be described.

For example, if a guest comes, the electric lock of the entry hall can be unlocked from the kitchen or by means of the electric lock unlocking switch (not shown, but having the same equivalent functions as those of the electric lock in FIG. 3).

If a window in the vicinity of the entry hall is opened; (it is assumed that window monitoring mode is preset by a panel switch of the RMC-E type body), a special sound is generated by the pseudo sound generator in the RMC-E type main body and is displayed as is similar to the case of RMC-K (kitchen) and since invasion is informed to the other RMC group simultaneously with this, abnormality such as invasion may be recognized in other rooms as in the RMC-K (kitchen).

The RMC-B type (bath room) is basically identical with the other RMCs except that it has ports for bath water level sensor 8 and temperature sensor 9, as input and outputs necessary for monitoring elements in the vicinity of the bath room.

As mentioned in detail, if a necessary number of plural kinds of RMC group are provided on necessary time, the peculiar input and outputs of different RMCs may not only be managed, but also the occurrence of abnormalities may be informed to the other RMCs. Accordingly a home security/control system having a great deal of flexibility may be provided.

Figure 6:
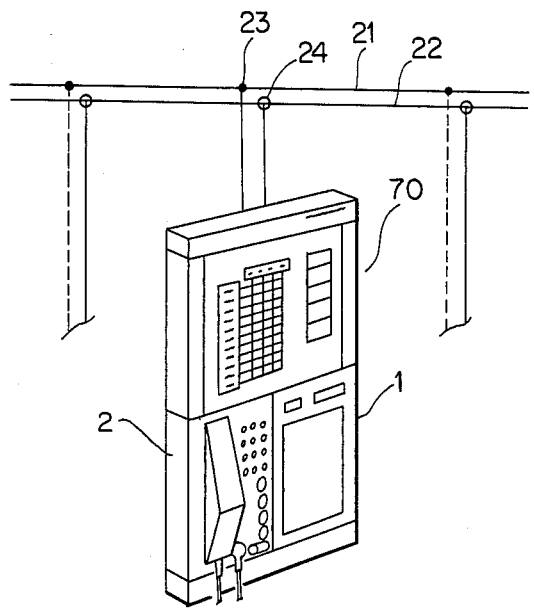
FIG. 6 is a view showing another embodiment in which an MMC (main monitor controller) is newly connected to RMC group.

The operation of the RMC group which have been distributedly arranged and distributedly processed may be centrally monitored and controlled by disposing an MMC (main monitor controller) 70 at a desired position in the RMC subsystem as shown in FIG. 6.

Up to a predetermined number of MMCs may be optionally provided. The MMC may be used as a parent or subsidiary device for centralized monitor/control. For example, one MMC is provided near RMC-K (kitchen) and one MMC is provided in the bed room for remote control of the air conditioner 18 and the light 17.

The operation of the interphone 2 will now be described. The host interphone has special function and is incorporated in the afore-mentioned telephone main device 25 so that it may be also used as an additional device for home telephone by connecting it with a telephone main device 25 in the future unlike the RMC-K type. According to other system configuration, a predetermined maximum number (for example 8) of interphones may be freely turned on or off, similar to RMC subsystem.

A pair of analog audio lines 21 are shown in FIG. 1. A plurality of channels may be provided by frequency multiplexing the line or by providing a plurality of lines.

The operation in connection with one line will be described as an example.

Figure 7:
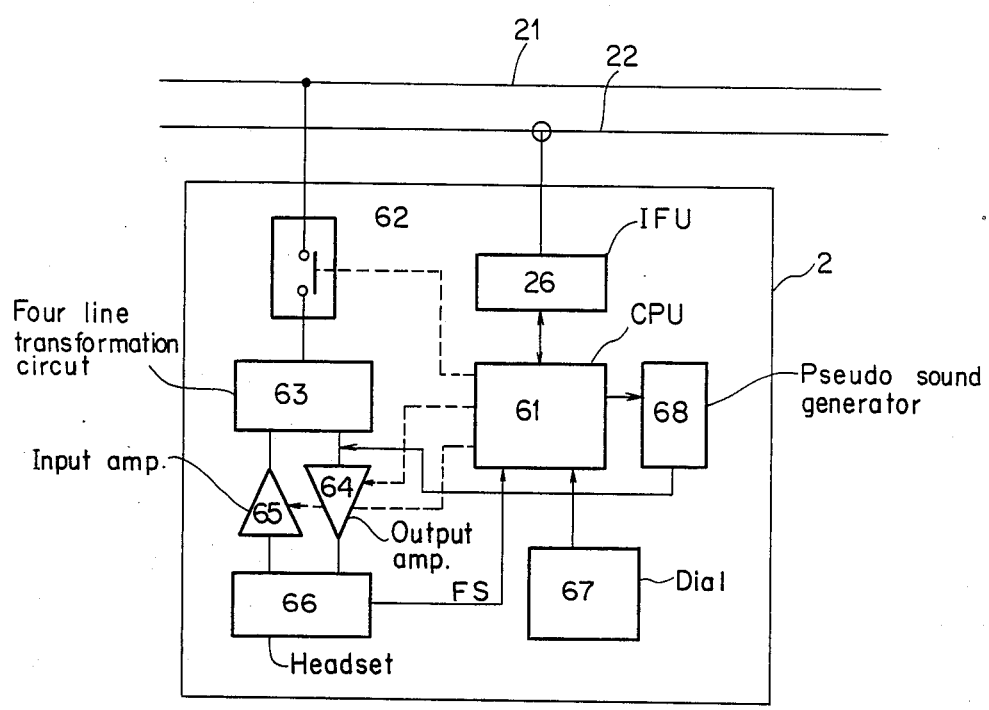
FIG. 7 is a schematic block diagram showing a subsidiary interphone.

FIG. 7 shows that the interphone is connected with the analog voice bus 21 via the IFU 26, digital voice bus 22 or switch 62.

The signals which are output and input via the IFU 26 are controlled by CPU 61. The voice switch 62 is also controlled by the CPU 61. The audio signals are connected to an output amplifier 64 and an input amplifier 65 via a two line to four line transformation circuit 63. Reference numeral 66 represents a handset, the FS (fixed switch) signal of which is received by a microcomputor 61 together with the other inputs (dial, simultaneous speaking, holding). Reference numeral 68 represents a pseudo sound generator. In the drawing, when the handset is lifted, a lamp indicating that the extension line is busy lights. When a given number is pressed, a call sound is generated from the pseudo sound generator 68 built-in the interphone to be called (actually the number to be called is transmitted via the digital bus 22 to the telephone main device 25, so that a calling signal is transmitted to the corresponding additional device from the main device 25). When the person who is called responds, that is he lifts the handset 66, such a condition is transmitted to said main device 25. The audio lines at both sides are connected under monitoring of the main device 25 so that the communication is rendered possible. Since the voice line at this time is on-line, interruption from the other additional device is not permitted. However since the call sound (chime) of the entry hall is transmitted via the digital bus 22, a chime sound is selected from the pseudo sound generator 68 built-in to each additional device to inform the presence of a guest to two communicating persons using the interphone. Since once the handset 66 is returned to the original position, communication with the subsidiary device in the entry hall is rendered possible, inconvenience is not felt despite the single line. A "SIMULTANEOUS SPEAKING" is pressed so that a simultaneous speaking is possible. The main device 25 controls so that all the subsidiary interphones are brought into loud speaking mode, and the voice circuit is forced to be connected.

If the afore-mentioned interphone is disposed in parallel with the RMC 1 as shown in FIG. 1, the host device (RMC-K type of RMC 1 is adapted to suppress the output of the pseudo-sound generating circuit of the mode selected RMC on occurrence of abnormality by rendering a mode switch (not shown) in RMC 1 into a position "presence of interphone". This is formed by a program and is realized by transmitting the control signal using packet to a corresponding RMC. Accordingly, since the output of the built-in voice synthesizing circuit 27 is carried on the analog voice bus 21 in the loud speaking mode in the parent interphone, that is, telephone main device 25, the content of abnormality is heard as clear voice (not superposed on the pseudo-sound). For example, clear voices such as "fire", "thief", "gas leakage" etc. can be heard in the children's room by simultaneous loud speaking since the interphone system is operated in combination with RMC system if an abnormality occurrs. This is deemed a significant advantage of systematic configuration since the conventional home monitor panel and interphone system do not have such organic connection and is solely operated.

A function of the home telephone is created by the addition an interface with an external line (subscriber line) as shown in FIG. 2 in the main device 25 of the afore-mentioned interphone system. That is, when a ringing signal is input from the subscriber line 28, an incoming detector 32 is operated and the signal is input to the main control 36. Since the main control manages what interphone of a plurality of interphones is appointed to be in the reception mode, and whether or not the extention line 21 is busy, the main control transmits a code instructing the ringing sound generation to pseudo sound generating circuit 68 of the corresponding interphone via the IFU 26 in any case. Call via the external subscriber line may be noticed by the ringing sound when the extension line is busy. Communication may be rendered possible by putting the handset 66 back and lifting it again. When the extension line is not busy, it is rendered possible to communicate by lifting the handset 66 and similarly pressing the external-line buttoms. If the handset is raised after hearing ringing sound, it is transmitted to the main control 36 of the main device 25 via the digital bus. Accordingly the fixed switch 30 of the telephone circuit is turned on (handset is raised). At this time communication with the external subscriber line is first enabled.

The communication to the external line from the interphone 2 will now be described. After comfirming that the external line is not busy through an indication lamp, an external line buttom is pressed, and a given telephone number is dialed by means of annexed ten keys so that the interphone may be automatically connected with the external line. The control signals are received and transmitted during this period as follows: When the handset of the any one of additional interphones 2 is raised and the external-line buttom is pressed, the main control 36 recognizes the afore-mentioned operation via the IFU 26 for off-hooking (that is, turn on FS 30) for the preparation of dial transmission. Whenever a dial number is pressed on the interphone, a code representative of the dial number pressed is transmitted from the interphone to the main device 25. The code which has been input via the IFU 26 of the main device 25 is decoded in the main control 36 again for driving the dialer 32. By repeating this operation an effective number of times, the same operation is accomplished as is dialed by a conventional telephone. The interphone is thus connected with the destination station via the telephone exchanger. That is, direct dial transmission is possible from the interphone.

The operation when a telecontrol function is added to this home telephone function and the advantage of organic linkage of RMC system will now be described in brief.

A telecontrol circuit, comprising a busy tone detection circuit 41, a DTMF receiver 42, a voice synthesizing circuit 27 used for the interphone system, which is converted for the telecontrol and a code number presetting circuit 34 in which a partial telecontrol function is added to the program of the main control unit 36 on freely presettable, is added to a device shown is FIG. 2. An owener of the telephone goes out of his house after presetting the telephone in the absent mode. If the number of his own telephone is called by a DTMF type pushphone, a voice "no body is in the house" is generated by the voice synthesizing circuit. When the code number which only the owner knows is input, the input status (presence or absence of abnormality) of the sensors connected with RMC or turning on or off of the load may be monitored. Furthermore predetermined loads having a high security may be instructed to be turned on or off by DTMF signal. In this case, the monitoring and control instructions are carried out by causing the control 36 to read the signals demodulated by the DTMF receiver 42 in the main device 25 and feeding them to RMC 1 via the digital bus 22. Accordingly the RMC group systemized by using the IFU 26, interphone group and telecontrol main device effectively link to provide a telecontrol system having a high degree of extendability.

Although the invention has been described under the assumption that a pair of voice lines (busses) and a pair of digital (control) busses are provided, it is possible that the number of busses (only voice lines) may be increased to provide multiple channels or all lines be made of a pair of lines to multiplex the voice and digital lines for reducing the number of lines if a slight increase in cost may be neglected.

As described above, a plurality of subsystems such as are RMC system (security, home control function), interphone system, home telephone main device, telecontrol system etc. may be stacked in a building block manner, so that the system is capable of responding to simple control and monitoring function to high level home telephone, and telephone control functions without changing the operating program.

As mentioned in detail, both the RMC system and interphone system are provided with a pair or a plural pairs of information communication paths (home busses) in the home. The RMC and the interphone having an interface unit (IFU) which is connected with a home bus via an information outlet. Accordingly, when the RMC and the interphone are to be added, they should be only connected with the home bus via the information outlet. Additional wiring which has previously been required by prior art systems is thus eliminated.

What is claimed is:

1. A home control system for the prevention of theft and fire in rooms and for the control of appliances installed in each room, comprising:
    (a) home information transmission paths connecting the rooms,
    (b) connection means attached to said home information transmission paths for connecting the appliances and the like to said transmission paths, and
    (c) a plurality of monitor controllers, having interface units and connectable to said information transmission paths, installed in selected rooms for transmitting and receiving information between one another along the transmission paths through the connection means, and controlling the appliances while monitoring conditions of the rooms and outputting signals in accordance with the conditions, and wherein:
        (1) one of said monitor controllers operates as a parent controller of other of said monitor controllers,
        (2) the parent controller has means for communicating with the selected ones of said monitor controllers which are connected with the parent controllers by way of said information transmission paths, one by one in an order of predetermined addresses and at a repeated frequency, whereby the parent controller recognizes and monitors each of the other of said monitor controllers connected to the system, and
        (3) the parent controller having register means for registering the other of said controllers recognized and monitored by the present controller and automatically registering new monitor controllers added to the system.

2. The system of claim 1, wherein said communicating means recognizes and monitors the other of said controllers at each cycle of said repeated frequency, whereby said register means is updated to add or delete monitor controllers added to or deleted from the system.

3. The system of claim 2, wherein the parent controller includes means for transmitting response-demanding signals in the order of said predetermined addresses to the other of said controllers, said parent controller also including means for determining if each of said other controllers is connected to the system or not by the existence or non-existence of response from the other of said controllers.

4. The system of claim 3, wherein the registering means of said parent controller includes means for adding to said registering means a new monitor controller connected to the system and not previously registered, when receiving an indication of abnormality in a room transmitted from said new monitor controller to said parent controller.

5. A control system for the prevention of theft and fire in a plurality of rooms and also for the connecting of selected ones of said rooms by interphones, comprising:
    (a) home information transmission paths connecting the rooms,
    (b) connection means attached to said information transmission paths for connecting the paths to a corresponding interphone, and (c) an innerface unit connected to each interphone in said selected rooms, each interface unit further being connected to the information transmission path through said connecting means: and wherein,
   (1) one of said interphones operates as a parent interphone to the other interphones in the system,
   (2) a recognition means included in said parent interphone for communicating through said information transmission paths, with the other of said interphones one by one in accordance with predetermined addresses and at a predetermined frequency in order to recognize said other interphones connected to said system, and
   (3) registering means included in said parent interphone for registering said other interphones recoginized by said recognition means and communicating with said other interphones having been registered.

* * * * *